May 29, 1945.  D. HEYER  2,377,009
AUTOMATIC POWER TRANSMISSION
Filed Dec. 1, 1939  4 Sheets-Sheet 1

Fig. 1.

INVENTOR
*Don Heyer*
BY
ATTORNEY

May 29, 1945. D. HEYER 2,377,009
AUTOMATIC POWER TRANSMISSION
Filed Dec. 1, 1939 4 Sheets-Sheet 3

INVENTOR
Don Heyer
BY
ATTORNEY

May 29, 1945. D. HEYER 2,377,009
AUTOMATIC POWER TRANSMISSION
Filed Dec. 1, 1939 4 Sheets-Sheet 4

INVENTOR
Don Heyer
BY
ATTORNEY

Patented May 29, 1945

2,377,009

UNITED STATES PATENT OFFICE 2,377,009

AUTOMATIC POWER TRANSMISSION

Don Heyer, Inglewood, Calif.

Application December 1, 1939, Serial No. 307,102

20 Claims. (Cl. 192—3.2)

This invention relates to automatic transmission; and has special reference to power transmission mechanisms operative to circulate and discharge fluid against impeller devices of the driven member to operate and to effect a change in speed thereof in proportion to the amount of force created by the fluid acting against the same.

Objects of the invention are to provide an improved automatic power transmission mechanism having a driving impeller arranged in such a relationship with respect to a co-operating driven impeller that the fluid circulated and discharged by the driving impeller will automatically maintain the driven impeller at the proper speed in accordance with the load requirements; to provide a differential gearing effecting a greater reduction in speed between the driving and driven mechanism than the slip induced by the fluid; to provide means in connection with the power transmission mechanism for controlling the flow of fluid therethrough, so as to maintain the operation of the driven mechanism in accordance with the torque required; and to provide manual means for varying the speed at which the driven mechanism will be operated by controlling the amount of fluid impinging against the blades of the driven impeller.

Another object of the invention is to provide manually set and automatically operable mechanism for controlling the speed of the load shift.

Another object of the invention is to provide means for disconnecting the source of power from the driven mechanism, and means for directly connecting the source of power with the load shaft, automatically and in accordance with the requirements of the load.

Another object of the invention is to provide means for changing the direction of rotation of the load shaft by manually controllable devices.

Another object of the invention is to provide an improved automatic power transmission mechanism embodying the useful co-operative relationship of elements herein disclosed, functioning to attain the new and useful results and effects and applicable to many uses, all of which should be apparent from the following description, reference being made to the annexed drawings, in which—

Figure 1:
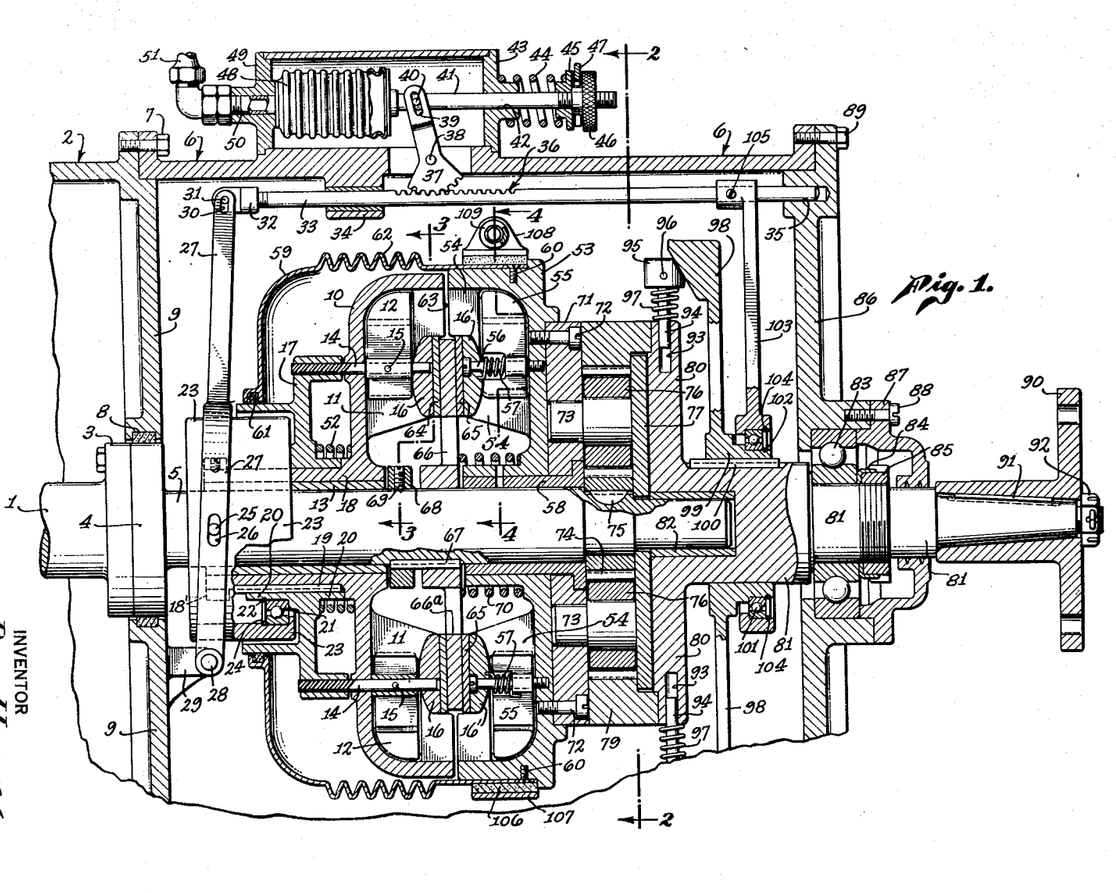
Fig. 1 is a longitudinal sectional view of an automatic power transmission mechanism made in accordance with the present invention.

Referring more particularly to Fig. 1, the shaft 1 of a gasoline engine or other source of power 2, has a flange 3 formed integral with the shaft of the said gasoline engine and is in constant driving relation with the flange 4, formed integral with the power shaft 5, of the automatic power transmission.

A housing 6, encloses the transmission mechanism and is attached to the gasoline engine 2 by the cap screws 7. The packing means 8, effects an oil seal between the wall 9, of the gasoline engine 2, and the flange 4 of the power shaft 5.

A driving impeller unit comprising an enclosing casing 10, and a series of vanes 11 and 12 is appropriately mounted on a bushing 13 and is arranged to rotate with respect to the power shaft 5 and for axial movement thereon. The vanes 11 extend radially and longitudinally with respect to the axis of the power shaft 5. The vanes 12 are arranged for pivotal movement on the shafts 14, and are secured thereto by the pins 15. The shafts 14, are appropriately supported by bearings formed in the enclosing casing 10 and in the fluid guide ring 16. The vanes 12, co-operate with the vanes 11, and increase or decrease the effective vane area of the driving impeller unit in accordance with the load requirements.

A flange 17 is arranged for axial movement on the hub 18 of the enclosing casing 10 and is maintained in rotative driving relation therewith by the key 19. The hub 18 is provided with a stop collar 18' which is secured thereto, and is engaged by the hub 20 of the flange 17 upon operation of the control mechanism to disengage the power shaft 5 from the driving impeller unit, the operation of which will be explained later.

Figures 5, 6, 7, 8, 9, 10:
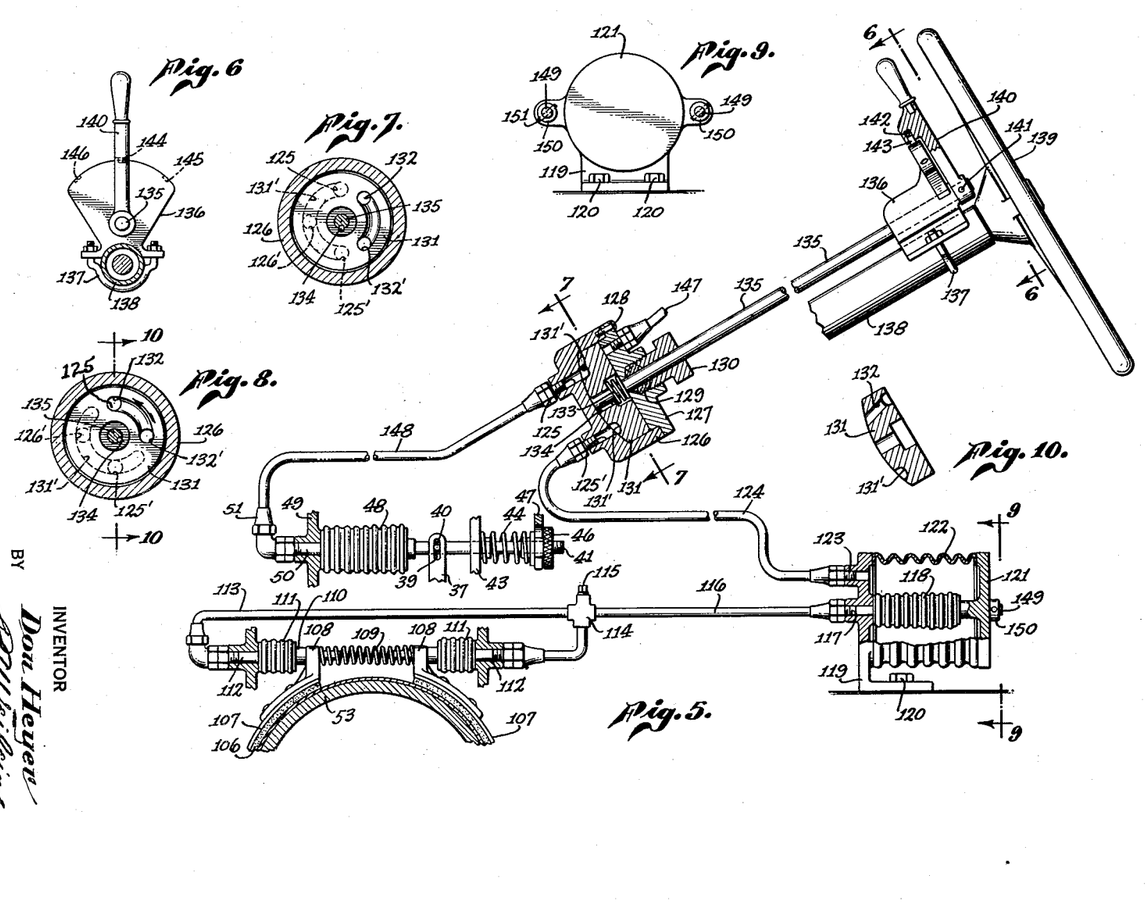
Fig. 5 is a diagrammatic elevation of the control mechanism.
Fig. 6 is a view of the control lever and indicating mechanism on line 6—6 of Fig. 5.
Fig. 7 is a cross-sectional view through the valve housing on line 7—7 of Fig. 5 and shows the valve in neutral position.
Fig. 8 is a sectional view similar to Fig. 7, showing the valve in forward position.
Fig. 9 is an end elevation of the metal bellows supporting mechanism on line 9—9 of Fig. 5.
Fig. 10 is a cross-sectional view through the control valve on line 10—10 of Fig. 8.

The hub 20 carries the inner race of a ball bearing 21 which is held in proper position by a lock ring 22. The outer race of the ball bearing 21 is contained in the sleeve 23 and is held in proper position by the lock ring 24. The sleeve 23 has affixed thereto, the pins 25 that engage the slots 26 formed in the clutch throw-out lever 27. The clutch throw-out lever 27 is pivotally mounted at the lower end on the pin 28 and the bearing 29, which is supported by the wall 9. The upper end of the clutch throw-out lever 27 is provided with the slots 30 that engage a pin 31 affixed to the adapter 32 that is in threaded engagement with the shift rod 33. The bearings 34 and 35 support the shift rod 33 for axial movement. A rack gear is formed in a portion of the shift rod 33 and engages a segment gear 37 that is pivotally mounted on a pin 38 affixed to the housing 6. The slots 39 are formed in the upper end of the segmental gear 37 and engage a pin 40 which passes through the guide rod 41 and is secured thereto. The guide rod 41 is arranged for axial movement and is supported on the extended end by the bearing 42 formed in the hub of the flange 43. A spring 44 is mounted between the flange 43 and a collar 45 and operates to disengage the clutch mechanism, the operation of which will be explained later. The guide rod 41 is provided with threads on the extended end that are in threaded engagement with a control knob 46 facilitating manual adjustment of the spring 44. A clutch throw-out yoke 47 is mounted between the collar 45 and the control knob 46 and may be used to engage the clutch mechanism by manual control means in the form of a foot pedal or lever (not shown in the drawings). At metal bellows 48 is affixed to the opposite end of the guide rod 41. The other end of the metal bellows 48 is supported by the flange 49 by means of the pipe 50 which is affixed to the said metal bellows and is connected with the vacuum control system by a pipe fitting 51, as shown in Fig. 5.

A spring 52 is mounted on the hub 20 of the flange 17 and the hub 18 of the enclosing casing 10 and tends to separate these structures.

A driven impeller unit comprises an enclosing casing 53, a series of vanes 54 integral with the said enclosing casing and a series of vanes 55 pivotally mounted on the screws 56 that are provided with spring tensioning means 57. The vanes 55 co-operate with the vanes 54 and increase or decrease the effective vane area of the driven impeller unit in accordance with the load requirements.

The driven impeller enclosing casing 53 co-operates with the driving impeller enclosing casing 10 to form an impeller chamber and the vanes 11 and 12 together with the vanes 54 and 55 are complementary so that, when the impeller chamber is substantially filled with fluid, the driving impeller unit will create a force whereby the fluid will operate the driven impeller unit in accordance with the load requirements.

The driven impeller enclosing casing 53 has a hub formed integral therewith and has the bushing 58 contained within, which is arranged to rotate upon and with respect to the power shaft 5. A cover 59 is affixed to the circumference of the enclosing casing 53 by means of the screws 60 and is provided with the packing means 61 effecting an oil seal between the transmission and the housing 6. An expanding and contracting means 62 is formed integral with the cover 59 to compensate for the change in volume of the fluid with temperature changes. An opening 63 allows fluid communication between the impeller chamber and the cover 59.

Figure 2:
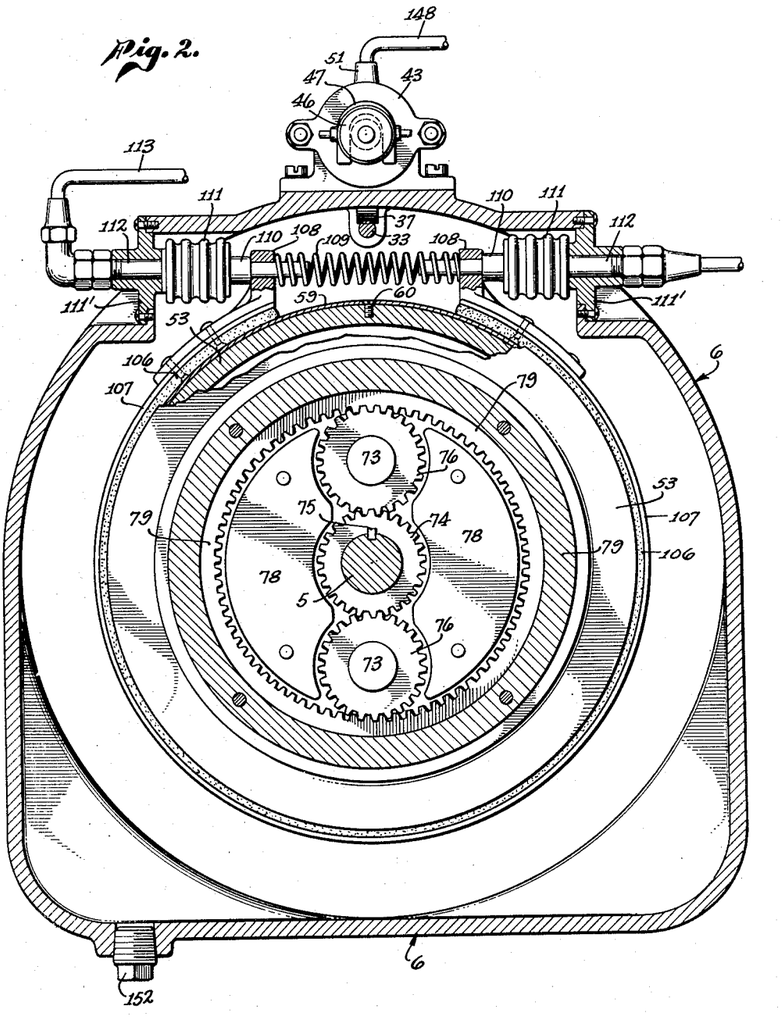
Fig. 2 is a cross-sectional view through the transmission mechanism on the line 2—2 of Fig. 1.

The fluid guide ring 16 is formed integral with the enclosing casing 10 and the fluid guide ring 16' is formed integral with the enclosing casing 53 and have mounted on and secured to their outer faces the clutch plates 64 and 65 respectively. The clutch plates 64 and 65 are shown (Fig. 1), in the engaged position and in direct driving relation with the clutch disc 66, but are arranged to be disengaged from the said clutch disc as will be explained later. The clutch disc 66 is slidably mounted on the power shaft 5 and is maintained in rotative driving relation therewith by the key 67. A stop collar 68 is mounted on and secured to the power shaft 5 by means of the set screw 69. A spring 70 is mounted on the hub of the enclosing casing 53 and abuts the clutch disc 66, tending to force the said clutch disc away from the clutch plate 65. A support plate 71 is attached to the enclosing casing 53 by the screws 72 and is in constant driving relation therewith. A pair of stub shafts 73 is affixed to the said support plate by means of a force fit in appropriate holes formed therein. A pinion 74 is mounted on the power shaft 5 and is maintained in constant driving relation therewith by the key 75. The pinion 74 meshes with a pair of diametrically opposite pinions 76 mounted for rotation on the stub shafts 73. A thrust plate 77 is secured to and rotates with the support plate 71 and is held in spaced relation therewith by the spacers 78 (Fig. 2). The pinions 76 are in constant mesh with an internal gear 79 which is affixed to and in constant driving relation with a flange 80. The thrust plate 77 is fitted closely between the internal gear 79, the pinions 74 and 76 and the flange 80 to maintain the various elements in proper position. The flange 80 is formed integral with the load shaft 81 and rotatively supports one end of the power shaft 5, by telescoping engagement with the bearing 82 contained therein. The load shaft 81 is rotatively supported by the ball bearing 83 which is held in fixed position on the said load shaft by a lock washer 84 and a lock nut 85. The outer race of the ball bearing 83 is contained in the cover plate 86 and is maintained in proper position by the bearing cap 87 attached to the said cover plate by the screws 88. The cover plate 86 is attached to the housing 6 by means of the cap screws 89 and forms one end of the housing enclosing the transmission mechanism. A drive flange 90 is mounted on the tapered extension of the load shaft 81 and is maintained in fixed driving relation therewith by a key 91 and a nut 92. The drive flange 90 may be connected to the drive shaft of a motor vehicle or other desired mechanism. Appropriate bearings 93 are formed in the flange 80 for the guide shafts 94 and the centrifugal weights 95 are affixed to the said guide shafts by means of the pins 96. Tapered cam surfaces are provided on one side of the centrifugal weights 95 that are pressed by the springs 97 and centrifugal force against mating surfaces formed on the radial arms 98. The radial arms 98 extend from the hub 99 which is slidably mounted on the load shaft 81 and is held in rotative driving relation therewith by a key 100. A ball bearing 101 is mounted on the hub 99 and is held in position by a lock ring 102. The outer race of the ball bearing 101 is contained in the hub of the shifting arm 103 and is held in position by a lock ring 104. The shifting arm 103 is mounted on and affixed to the shift rod 33 by means of the set screw 105.

Referring now to Fig. 2, the friction band 106, is secured to the reverse band 107, encircling and arranged for engagement with the circumference of the cover 59. The reverse band 107 is provided with ears 108 having a spring 109 mounted between, and tending to separate the same and maintaining the said ears in position against the pressure pins 110. The pressure pins 110 are affixed to the metal bellows 111 which have the pipes 112 affixed to their opposite ends, the said pipes supporting and maintaining the said metal bellows by means of holes in the hubs of the flanges 111' that are appropriately attached to the housing 6.

Reference is now made to Figs. 5 to 10, inclusive, the metal bellows 111 are connected by the pipes 112 with the pipe 113 and the connecting T 114 which is provided with a plug 115 to facilitate filling the hydraulic system with fluid. The pipe 116 connects with the connecting T 114 and thence to the pipe 113 and the pipes 112. The pipe 117 connects with the pipe 116 and has affixed on its opposite end the metal bellows 118 which is in fluid communication with the aforementioned piping. The flange 119 has a hole formed in the hub which supports the pipe 117 and thereby the fixed end of the metal bellows 118. The screws 120 affix the foot of the flange 119 to a suitable member of the motor vehicle structure. A flange 121 has a hub extending from the center and on its inner surface that supports one end of the metal bellows 118 while the said flange also has the metal bellows 122 affixed thereto and supports the same on one end. The opposite end of the metal bellows 122 is affixed to the flange 119 which has the pipe 123 threaded therein and connects the said metal bellows with the pipe 124 and the port 125' formed in the valve housing 126. The valve housing 126 also has the ports 125 and 126' formed therein, the functions of which will be explained later. The cover 127 is attached to the valve housing 126 by means of screws 128 and is provided with packing 129 which is held in place by a packing nut 130. A valve disc 131 operates within the valve housing 126 and is provided with the ports 132 and 132' and with an arcuate passage 131' formed in the under side thereof. A spring 133 maintains the said valve disc firmly seated in the valve housing 126. A key 134 affixes the valve disc 131 to the control shaft 135. A suitable control lever support bracket 136 is attached by means of the U bolt 137 to a steering column 138 on which is mounted a conventional steering wheel 139. A control lever 140 is affixed to the control shaft 135 by a pin 141. The said control lever has a hole formed therein to receive a small spring 142 that exerts sufficient pressure against a pawl 143 to maintain the said pawl in optional positions 144, 145 or 146. However, a slight pressure on the control lever 140 causes the pawl 143 to recede against the pressure of the spring 142 allowing the said control lever to be readily moved to the desired position.

The pipe 147 connects with the intake manifold of a gasoline engine (not shown in the drawings) and may be connected by the valve disc 131 with either the port 125 or the port 125' in the valve housing 126.

The pipe 148 connects the port 125 with the pipe fitting 51, the pipe 50 and the metal bellows 48.

The guide rods 149 are rigidly secured to bosses integral with the flange 119 (not shown in the drawings) similar to the bosses on the flange 121, except that the bosses on flange 121 are arranged to slide freely on the guide rods 149 toward the flange 119 which is secured in position by the screws 120. The collars 150 are affixed to the guide rods 149 by the pins 151 and provide a stop to limit the travel of the flange 121 away from the flange 119.

A plug 152 is threaded into the bottom of the housing 6 for draining the fluid when desired.

In describing the operation of the control system, it will be considered for convenience, that the automatic power transmission is installed in a motor vehicle. However, it will be understood that the invention may be used as a speed control mechanism between any source of power and driven mechanism of any nature.

The vacuum created in the intake manifold of a gasoline engine varies substantially inversely with the load, that is, as the load increases the vacuum force decreases. The maximum vacuum force is available at idling speeds when the throttle is practically closed. When the throttle is opened, especially if it is opened suddenly, the vacuum force decreases rapidly to a certain minimum value, and as the motor vehicle gains momentum and the load on the gasoline engine decreases, the vacuum force in the intake manifold increases. This variation in the vacuum force in cooperation with the mechanical control mechanism, is used to obtain the desired operating characteristics for the motor vehicle embodying the automatic power transmission.

The operation of the control system is as follows:

Reference is made to the drawings more particularly to Figs. 5 to 10, inclusive, where the control mechanism is shown installed on a steering column. When the control lever 140 is in the neutral position (as shown in Figs. 5 and 6) the pawl 143 engages the recess 144, and the valve disc 131 is then in the position as shown in Fig. 7. The port 132 does not register with its companion port 125 and the port 132' does not register with its companion port 125'; therefore, the pipes 124 and 148 are not in communication with the pipe 147 connecting with the vacuum force in the intake manifold and the control system is rendered inoperative. However, the circular passage 131' formed in the under side of the valve disc 131 is in communication with the ports 125, 125' and 126' formed in the valve housing 126. The port 126' is open to the atmosphere and therefore allows the metal bellows 48 and the metal bellows 122 communication therewith when the control lever 140 is in the neutral position as shown in Fig. 7.

Upon the movement of the control lever 140 to the neutral position and the disconnection of the vacuum force from the metal bellows 48, the spring 44, through the associated control mechanism moves the driving impeller unit toward the wall 9 and away from the driven impeller unit. This allows the spring 70 to move the clutch disc 66 longitudinally on the power shaft 5 and away from the clutch plate 65, until the hub of the said clutch disc abuts the stop collar 68 thereby disengaging the power shaft 5 from the driven impeller unit. The spring 52 then forces the enclosing casing 10 to cease moving and the flange 17 moves away from the said enclosing casing until the hub 20 of the said flange abuts the stop collar 18' which is secured in position on the hub 18 of the enclosing casing 10. When the hub 20 engages the collar 18' the enclosing casing 10 (and the driving impeller unit) is moved longitudinally on the power shaft 5, with the flange 17 until the clutch plate 64 is disengaged from the clutch disc 66, thereby disengaging the said power shaft from the driving impeller unit and rendering the fluid transmission mechanism inoperative.

To operate the motor vehicle in a forward direction the control lever 140 is moved so that the pawl 143 engages the recess 146 and the valve disc 131 will then be in the position shown in Fig. 8, the port 132 in the said valve disc registering with the port 125 in the valve housing 126.

Assuming the gasoline engine of the motor vehicle is running, the vacuum created in the intake manifold is in communication with the metal bellows 48 through the pipe 147, the ports 132 and 125, the pipe 148, the pipe fitting 51 and the pipe 50 connecting the said metal bellows. The vacuum force causes the movable end of the said metal bellows, which is affixed to the guide rod 41, to move toward the flange 49 operating the segment gear 37. The segment gear 37 engages a rack gear 36 formed on the shift rod 33 and thereby operates the clutch throw-out lever 27 and the associated clutch control mechanism as previously explained. The spring 44 is preset to a certain value by the control knob 46, so that when the vacuum force decreases to a lower value, the said spring will operate the associated clutch control mechanism to disengage the power shaft 5, from the driven impeller unit changing the device from a direct drive as shown in Fig. 1, to a fluid differential transmission.

It has been previously explained that when an increased load is imposed upon a gasoline engine, such as starting the motor vehicle, negotiating a grade, driving on heavy roads, etc., the vacuum force in the intake manifold is decreased, but the said vacuum force is always adequate to maintain the clutch plate 64 engaged with the clutch disc 66, so that the driving impeller unit is always in constant driving relation with the power shaft 5 when the control lever 140 is in the forward position.

The driving impeller unit which is operating at the speed of the source of power, by means of the vanes 11 and 12, circulates the fluid within the impeller chamber and, as the fluid is thrown outwardly by centrifugal force, it impinges against the vanes 54 and 55 of the driven impeller unit and gives up its kinetic energy and thereby drives the driven impeller unit in the same direction but at a speed in accordance with the load requirements. A reduction in speed of the driven impeller unit effects a greater change in the speed of load shaft 81, etc., by means of the differential gearing mechanism.

The fluid, after it has given up its energy, follows the wall of the driven impeller unit toward the center of the impeller chamber and thence through openings 66—a in clutch disc 66 into the driving impeller unit where it is again picked up and re-circulated. The impeller devices are provided with variable means to obtain an increase or decrease in the effective vane area which greatly increases the efficiency of the device and reduces the load on the source of power while the motor vehicle is being operated by means of the fluid differential transmission.

Figure 3:
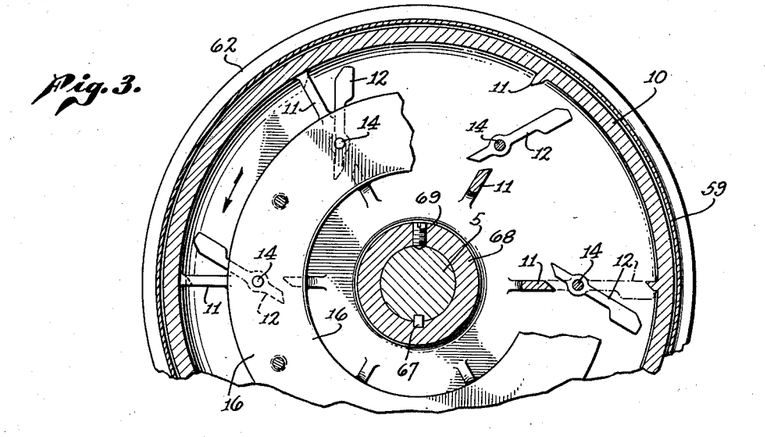
Fig. 3 is a cross-sectional view of the driving impeller mechanism on line 3—3 of Fig. 1.

The driving impeller unit has the pivotally mounted vanes 12 that are controlled by a screw device on the pivot shaft 14 engaging a co-operating screw device in the flange 17. Centrifugal weights are formed on the outer surfaces of the vanes 12, that tend to close the said vanes as shown in the dotted position (Fig. 3). When the driving impeller in turning at a high rate of speed, in which condition the gasoline motor is capable of delivering a large amount of power, the centrifugal weights assist the screw elements in tending to close the vanes 12 against the fluid through which the impeller passes. The centrifugal force of the weights and the axial movement of the flange balance the force of the fluid on the vanes, but primarily the position of the flange is determinate of the position of the vanes. However, the vanes 12 are controlled in their operation by the clutch control mechanism, as follows:

When the spring 44 has disengaged the clutch disc 66 from the clutch plate 65, due to the decrease in vacuum force to a certain value in the metal bellows 48, the said spring will continue to operate the clutch control mechanism toward the wall 9, upon a further decrease in the vacuum force. The stop collar 68 limits the longitudinal travel of the clutch disc 66 on the power shaft 5 and if the control throw-out lever 27 continues to move toward the wall 9, the spring 52 operates to maintain the clutch plate 64 engaged with the clutch disc 66, while the flange 17 moves away from the enclosing casing 10. This movement of the flange 17 away from the enclosing casing 10 causes the screw devices in the said flange and on the pivot shafts 14 to operate the vanes 12 and thereby decreases the effective area of the driving impeller unit.

Figure 4:
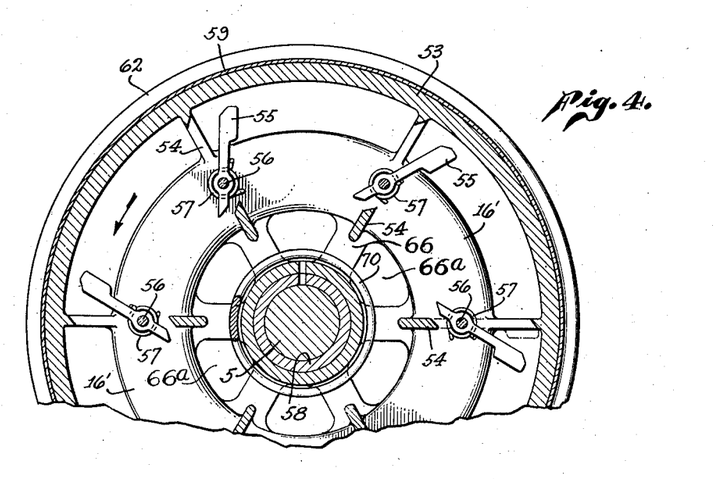
Fig. 4 is a cross-sectional view through the driven mechanism substantially on line 4—4 of Fig. 1 certain parts being omitted.

The driven impeller unit is provided with pivoted vanes 55 that have centrifugal weights formed on their outer surfaces and are mounted on the screws 56. The centrifugal weights, in co-operation with the springs 57 and the fluid impinging against the said vanes tends to maintain them closed, as shown in the dotted position (Fig. 4). The springs 57 are of sufficient strength to maintain the vanes 55 closed when the device is at rest.

When the torque required on the shaft 81 is suddenly increased, as by the vehicle encountering difficult road conditions, the driven impeller will rapidly decrease in speed, and through the planetary gearing, the torque on the driven shaft will be increased, such increase being accompanied by a decrease in the speed of the load shaft. This decrease in the speed of the driven impeller causes the fluid which strikes the vanes of the driven impeller to give up larger portions of its energy. When this happens, there will be portions of the fluid which are travelling around in the driven impeller at a slower velocity than the velocity of the impeller, although of course the integrated velocity of the fluid will always be greater than that of the impeller. The portions of the fluid which are travelling slower than the impeller would normally be struck by the vanes overtaking them, thus exerting a force tending to slow the driven impeller down. However, the vanes are mounted to pivot, and being so mounted, they can swing back and let the slow moving fluid through the vane in a reverse direction to the driving direction. As this effect is much more pronounced during periods when the device is operating at low driven impeller velocity, the weights are utilized to maintain the vanes closed during periods of high speed operation of the driven impeller, when this effect is not so pronounced.

The centrifugal device incorporated on the load shaft 81 comprises the centrifugal weights 95 affixed by the pins 96 to the guide shafts 94 which are appropriately mounted in the bearings 93 formed in the flange 80. Tapered cam surfaces on one side of the centrifugal weights 95 are pressed against similar mating surfaces formed on the radial arms 98 by the springs 97. Centrifugal force is created and exerted by the centrifugal weights 95 in proportion to the speed of the load shaft 81 and as the said load shaft increases in speed an increasing amount of force is exerted against the radial arms 98 by the said centrifugal weights. The radial arms 98 transmit this force, through the ball bearing 101, moving the shifting arm 103 toward the cover plate 86, and as the shifting arm 103 is affixed by the set screw 105 to the shift rod 33, the force is conveyed to the associated control mechanism. Therefore, it will be seen that the said centrifugal device co-operates with the vacuum device to engage the clutch disc 66, with the clutch plate 65, thereby effecting a direct drive between the power shaft 5 and the load shaft 81, when the said load shaft has attained the proper speed in accordance with the load requirements. Thus, if the vehicle is travelling on a level road, and reaches the correct speed for direct drive, the centrifugal weights cause the engagement of the clutch faces. If the driver takes his foot off the accelerator, the vehicle will remain in direct drive, even though the load shaft slows down so that the weights are no longer effective by themselves. But if he then opens the throttle, the decrease in the vacuum will cause disengagement of the clutch faces, until the weights again cause the clutch to engage. In a similar manner, if he attempts to accelerate, when the clutch is engaged, the vacuum decrease will overcome the force exerted by the weights, and disengage the clutch faces, permitting the motor to speed up, the increased power resulting from the wider open throttle being evidenced by an increase in speed of the drive shaft, and being translated by the impellers and the planetary gearing into an increased torque on the load shaft which accelerates the car. As the centrifugal device is responsive to the speed of the engine and the throttle opening, the two together will, for any given speed of engine and throttle opening (horsepower), cause the engagement of the clutch at a certain definite speed. As the horse power at the load shaft is roughly the same as the horsepower delivered by the engine, and horsepower divided by speed gives torque, the clutch will engage at a definite torque on the load shaft.

Referring now to the Figs. 2, 5 and 6, the operation of the reverse mechanism will be explained. To obtain a reverse rotation of the load shaft 81 (Fig. 1) the control lever 140 is moved so that the pawl 143 engages the recess 145. When the said control lever is in this position, the port 132' in the valve disc 131 is aligned with the port 125' in the valve housing 126. Therefore, the vacuum force created in the intake manifold of the gasoline engine is in direct communication through the pipe 147, the ports 132' and 125', the pipes 124 and 123 with the metal bellows 122. When the vacuum force is admitted to the said metal bellows, it results in the movement of the flange 121 toward the flange 119. The metal bellows 118 is affixed to the said flanges as previously explained and contains a hydraulic fluid. The said metal bellows is in direct fluid communication at all times with the metal bellows 111, through the connecting pipes 117, 116, the connecting T 114 and the pipes 113 and 112. It will be readily seen that as the metal bellows 122 contracts, moving the flange 121 towards the flange 119, the metal bellows 118 will also be contracted. This results in the flow of the hydraulic fluid from the metal bellows 118 to the metal bellows 111, thereby expanding the same. The expansion of the said metal bellows moves the pressure pins 110 and thereby the ears 108, which are affixed to the reverse band 107, toward each other, engaging the friction band 106 with the cover 59. When the said cover and its associated mechanism is held against rotation, it effects a fulcrum for the planetary gearing, the pinions 76, will be rotated by the pinion 74, in the opposite direction on the stud shafts 73, resulting in the reversal in rotation of the internal gear 79, and the connecting load shaft 81 relative to the power shaft 5.

Upon return of the control lever 140 to the neutral position, the spring 109 forces the ears 108 away from each other, contracting the metal bellows 111, thereby returning the hydraulic fluid to the metal bellows 118, resulting in the disengagement of the reverse mechanism.

For convenience I have described one of the impeller units as the "driving impeller unit" and the other as the "driven impeller unit," however, it will be understood that these terms are merely relative and that the "driving impeller unit" could readily become the "driven impeller unit," and the "driven impeller unit" the "driving impeller unit."

It is now apparent that the invention attains all of its objects and purposes very efficiently and that the operations of many of the parts and devices are automatic. The parts are assemled in such a manner that they may be readily assembled or removed, and they may be varied as to form within the scope of equivalent limits as defined by the appended claims.

I claim:

1. In automatic power transmission mechanism having a fluid driving impeller, a fluid driven impeller supported for differential movements with respect to and co-operating with said driving impeller to form an impeller chamber adapted to contain fluid for operation of said driven impeller, a load shaft, mechanism for operating said load shaft by said driven impeller in co-operation with said driving impeller, and vacuum operated control mechanism co-operating with centrifugal devices responsive to the speed of said load shaft, said control mechanism varying the coupling between said impellers in accordance with the load requirements.

2. In an automatic power transmission mechanism having a fluid driving impeller, a fluid driven impeller co-operating with said driving impeller to form an impeller chamber; means to adjust the axial spacing between said impellers to alter the coupling therebetween, and means for supplementarily altering said coupling by varying the effective area of at least one of said impeller devices.

3. In an automatic power transmission mechanism having a fluid driving impeller, a fluid driven impeller co-operating with said driving impeller to form an impeller chamber, and a load shaft; automatic means responsive to the torque requirements of said shaft for controlling the effective area of at least one of said impeller devices, and means responsive to the speed of said load shaft cooperating with said automatic means to control said area.

4. In an automatic power transmission mechanism having a fluid driving impeller, a fluid driven impeller co-operating with said driving impeller to form an impeller chamber, and a load shaft; manually controllable automatic means responsive to the torque requirements of said shaft for varying the effective area of at least one of said impeller devices, and means responsive to the speed of said load shaft cooperating with said automatic means to control said area.

5. An automatic power transmission mechanism including a fluid driving impeller, a fluid driven impeller, and a load shaft; vacuum control mechanism operated in accordance with the torque requirements of said shaft, centrifugal control devices responsive to the speed of the load shaft, means responsive to operation of said control mechanism and said centrifugal devices to effect a synchronous drive between said impeller devices when said load shaft has attained a predetermined speed in relation to the torque requirements.

6. An automatic power transmission mechanism including a fluid driving impeller, a fluid driven impeller, and a load shaft; vacuum operated control mechanism, centrifugally operated devices responsive to the speed of said load shaft, means responsive to the operation of said control mechanism and said centrifugal devices for moving said driving impeller towards said driven impeller when said load shaft has attained a predetermined speed in relation to the torque requirements.

7. An automatic power transmission mechanism including a fluid driving impeller, a fluid driven impeller, and a load shaft; automatic means responsive to the torque requirements of the load shaft for moving said impellers apart, and speed responsive means acting to assist said automatic means when said load shaft has decreased to a pre-determined speed in relation to the torque requirements.

8. An automatic power transmission mechanism including a fluid driving impeller, a fluid driven impeller, and a load shaft; manually adjustable automatic means responsive to the torque requirements of the load shaft for moving said impellers apart, and speed responsive means acting to assist said automatic means when the speed of said load shaft has decreased to a pre-determined minimum in relation to the torque requirements of the load.

9. An automatic power transmission mechanism including a fluid driving impeller, a fluid driven impeller, and a load shaft; automatic means responsive to the torque requirements of the load shaft to effect a synchronous drive between said impeller devices when said load shaft has attained a predetermined speed in relation to the torque requirements, and means responsive to the speed of said shaft acting to assist said automatic means.

10. In an automatic power transmission mechanism for an internal combustion engine having a fluid driving impeller, a fluid driven impeller, and a load shaft; means for varying the fluid coupling between said impellers, and control means operated by the vacuum of said engine for operating said means in accordance with the speed of the engine.

11. In an automatic transmission including a fluid driving impeller, a fluid driven impeller, and a load shaft; means for varying the effective coupling between said impellers in response to the torque requirements and speed of the load shaft, and means automatically operated by said torque and speed responsive means means for effecting a synchronous drive between said impellers when said load shaft has attained a predetermined speed in relation to the torque requirements.

12. In an automatic transmission including a fluid driving impeller, a fluid driven impeller, and a load shaft; means for varying the effective area of at least one of said impellers in response to the torque requirements and speed of the load shaft, and means for effecting a synchronous drive between said impellers when said load shaft has attained a predetermined speed in relation to the torque requirements.

13. In an automatic transmission including a fluid driving impeller, a fluid driven impeller and a load shaft; means mounting said impellers for relative axial movement with respect to each other for varying the coupling therebetween, means for effecting a synchronous drive between said impellers upon predetermined relative axial movement, and means for automatically moving said impellers relatively axially in response to the torque requirements and speed of said load shaft.

14. In an automatic transmission including a driving impeller and a driven impeller; said impellers being mounted for relative axial movement with respect to each other for varying the effective coupling between them, a member for driving said driving impeller, means for effecting a synchronous drive between the impellers upon a predetermined relative axial movement therebetween in one direction, and means for releasing said driving impeller from said member upon relative axial movement in the opposite direction.

15. In an automatic transmission including a driving impeller and a driven impeller rotatably mounted for relative axial movement with respect to each other on a power shaft; a clutch plate in driving relation to said shaft and adapted to engage and drive said driving impeller, and means whereby relative movement of said impellers toward each other brings the clutch plate into driving relation with said driven impeller.

16. In an automatic transmission including a power shaft, a fluid driving impeller and a fluid driven impeller rotatably mounted on said shaft, one of said impellers being axially fixed on said shaft, the other impeller being axially movable thereon, a load shaft, and means operatively connecting said driven impeller with said load shaft; a clutch plate slidable on the power shaft between the impellers but secured against rotation with respect thereto, means urging said clutch plate axially of the shaft out of driving relation with the driven impeller and toward the driving impeller, and means urging the driving impeller into driving relation with the clutch plate, said means being responsive to the speed and torque requirements of said load shaft for urging said impellers relatively toward each other whereby the clutch plate is urged into driving relation with the driven impeller when the ratio between the speed and torque reaches a predetermined value.

17. In an automatic transmission for an internal combustion engine, having a fluid driving impeller, a fluid driven impeller, and a load shaft; means for varying the fluid coupling between said impellers, and control means continuously connected to said engine for operation in response to changes in the vacuum therein for actuating said means, whereby the coupling is varied in accordance with the torque requirements of the load shaft.

18. An automatic power transmission mechanism comprising a driving shaft, a fluid driving impeller, a fluid driven impeller, means for operatively connecting said driving impeller with said driving shaft, means for optionally operatively connecting said driven impeller with said driving shaft, a load shaft adapted to be driven by said driven impeller, and manually adjusted automatic means for disconnecting said impellers from said driving shaft when the speed of said load shaft has decreased to a predetermined minimum in relation to the torque requirements of the load.

19. In an automatic power transmission mechanism having a driving impeller, a driven impeller coaxial therewith and axially spaced therefrom, and means forming an impeller chamber containing fluid in which said impellers are arranged to rotate, said impellers having complementary cooperating vanes, whereby the fluid serves to couple the impellers in driving relation, said coupling being a function of the axial spacing of the impellers as well as of the effective area of said vanes, the effective area of the vanes of at least one of said impellers being adjustable; means to adjust the axial spacing between said impellers to alter the coupling therebetween, and means responsive to said relative axial adjustment to adjust the effective area of said vanes.

20. In an automatic power transmission mechanism having a driving impeller, a driven impeller coaxial therewith and axially spaced therefrom, a load shaft operatively connected to said driven impeller, and means forming an impeller chamber in which said impellers are arranged to rotate, said impellers having complementary cooperating vanes, whereby the fluid serves to couple the impellers in driving relation, said coupling being a function of the effective area of said vanes, the effective area of the vanes of the driving impeller being adjustable; automatic means responsive to the torque requirements of said shaft for adjusting the said area, and means responsive to the speed of said load shaft cooperating with said automatic means to control said area.

DON HEYER.